No. 629,389. Patented July 25, 1899.
W. J. OTTO.
BICYCLE.
(Application filed July 15, 1898.)
(No Model.)
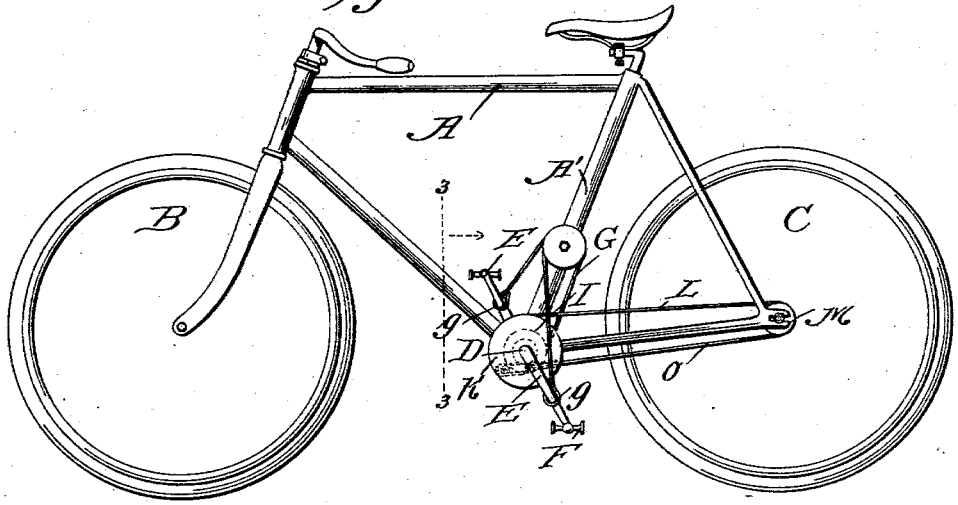
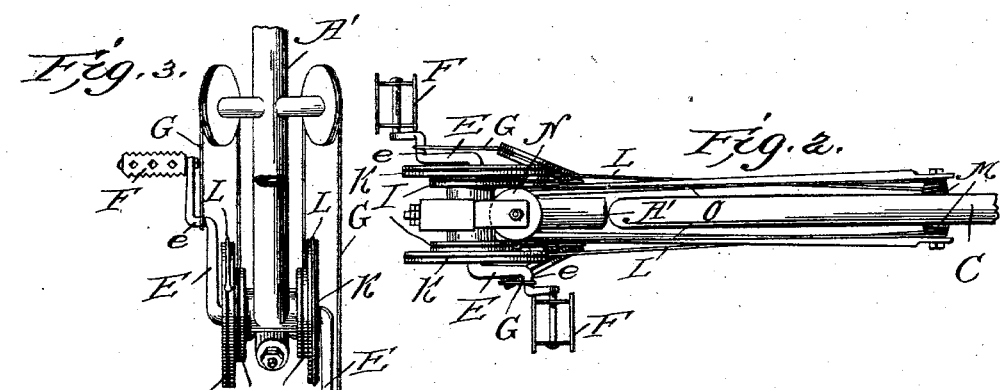
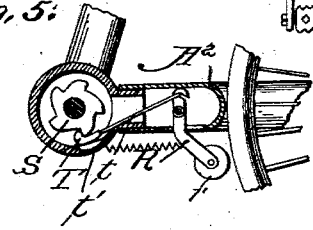
Attest
James M. Spear
F. L. Middleton
Inventor
William J. Otto
by Eli Spear
Atty.
THE NORRIS PETERS CO., PHOTO-LITHO., WASHINGTON, D. C.

UNITED STATES PATENT OFFICE.

WILLIAM J. OTTO, OF DENVER, COLORADO.

BICYCLE.

SPECIFICATION forming part of Letters Patent No. 629,389, dated July 25, 1899.

Application filed July 15, 1898. Serial No. 685,992. (No model.)

*To all whom it may concern:*

Be it known that I, WILLIAM J. OTTO, a citizen of the United States, residing at Denver, county of Arapahoe, and State of Colorado, have invented certain new and useful Improvements in Bicycles, of which the following is a specification.

My invention relates to improvements in propelling mechanism for bicycles; and the object of the invention is to dispense with the use of a chain and sprockets or gearing as ordinarily used, substituting therefor a simple and effective arrangement of grooved pulleys or drums and driving cords or bands.

The invention consists in the particular arrangement of the parts, as hereinafter described, and particularly set forth in the claim.

The invention is illustrated in the accompanying drawings, in which—

Figure 1 is a side elevation of a bicycle having my improved driving or propelling mechanism applied thereto. Fig. 2 is a bottom view of the same, the front portion of the frame and front wheel being omitted. Figs. 3, 4, and 5 are detail views.

In the drawings, A represents the frame of the bicycle, B the steering-wheel, and C the driving-wheel, these being of the ordinary or any desired construction, except where it may be found necessary or desirable to modify the frame for the attachment of certain parts hereinafter referred to.

D represents the crank-shaft, which is journaled in the crank-hanger in the usual manner and carries at its ends the cranks E E, which are provided at their ends with the usual pedals F. Each crank is formed at a suitable distance from the crank-shaft with an angular bend or offset $e$, to which a cord G is connected by a suitable eye or hook $g$. From this offset the cord, which is preferably a fine steel cable, passes over a grooved idle pulley on the frame member A' and thence down to a grooved pulley I, journaled at the crank-shaft, to the periphery of which the said cord is attached in any suitable manner. A second grooved pulley K is also journaled at the crank-shaft and is rigidly connected with the pulley I, so as to turn therewith. A cord L, similar to cord G, has one end secured to the periphery of pulley K and thence passes backward to a grooved drum M, connected with the rear or driving wheel by a clutch mechanism of any desired construction, but preferably a ball-clutch. By this arrangement it will be observed that as the cranks rotate in the ordinary manner the cords G are alternately drawn upon and released, and an oscillating motion is thus imparted to pulleys I and K, and from pulleys K a corresponding oscillating motion is imparted by cords L to the drums, which by reason of their clutch connections impart their motion to the rear or driving wheel to drive or propel the bicycle. The comparative sizes of the pulleys L and K determine the amount to which the bicycle is "geared," and it will be readily seen that by making the pulleys I removable the "gear" may be changed by substituting larger or smaller pulleys.

The drums may be spring-drums of any desired construction arranged to wind up automatically after each unwinding of the cord; but I prefer to provide a pulley N beneath the crank-hanger, over which a cord O passes, the ends of which are secured to the drums M in such a manner that when one cord L is unwound from its drum the corresponding cord O will be wound upon the drum, and in unwinding from the drum on the opposite side the said cord O will cause the previously-unwound cord L to be wound up. The pulley N is preferably held under spring tension by a spring P, so that a constant tension is maintained on the cord O.

In Fig. 5 I have illustrated an improved automatic back-pedaling brake. This consists of a brake-lever R, pivoted to the frame member $A^2$, its upper end extending up into said tube or frame member, while its lower end is bent rearwardly and provided with a brake-surface, such as a roller $r$. A ratchet-wheel S is rigidly mounted upon the crank-axle and is adapted when the crank-shaft is rotated backwardly, as in back-pedaling, to engage with a spring-pressed hook or pawl T, connected by a suitable connection $t$ with the upper end of the lever R. A recess $t'$ is provided in the crank-hanger, into which this hook or pawl is pressed to clear the teeth of the ratchet-wheel on the forward rotation of the crank-shaft.

I claim—

In a bicycle, a pair of pivoted operating members, a cord connected to each member, grooved idler-pulleys journaled on the frame over which said cords run, grooved pulleys journaled at the axis of said operating members to which said cords are attached, a second set of grooved pulleys attached to those at the said axis, drums connected with the driving-wheel by suitable clutches, and cords connecting the drums with said second set of grooved pulleys, substantially as described.

In testimony whereof I affix my signature in presence of two witnesses.

WILLIAM J. OTTO.

Witnesses:
JAMES M. SPEAR,
WM. D. KILBOURN.